United States Patent
Stiles et al.

(10) Patent No.: US 6,212,471 B1
(45) Date of Patent: Apr. 3, 2001

(54) DYNAMIC OPTIMAL SENSOR EMPLOYMENT FOR SEARCHING AN AREA

(75) Inventors: Peter N. Stiles, Owego; Chris A. Bodenhorn, Vestal; Robert J. Szczerba, Endicott, all of NY (US)

(73) Assignee: Lockheed Martin Corporation, Owego, NY (US)

( * ) Notice: Subject to any disclaimer, the term of this patent is extended or adjusted under 35 U.S.C. 154(b) by 0 days.

(21) Appl. No.: 09/301,208

(22) Filed: Apr. 28, 1999

(51) Int. Cl.$^7$ .................................................. G06F 19/00
(52) U.S. Cl. ............................................. 701/207; 342/158
(58) Field of Search .................................. 701/207, 208; 702/5, 127, 150, 187; 348/143, 144; 342/46, 52, 53, 158, 371, 372, 451, 457

(56) References Cited

U.S. PATENT DOCUMENTS

| | | | |
|---|---|---|---|
| 4,495,500 | * 1/1985 | Vickers | 701/207 |
| 4,531,125 | * 7/1985 | Beyer et al. | 342/158 |
| 4,780,719 | 10/1988 | Frei et al. | 342/53 |
| 5,087,916 | * 2/1992 | Metzdorff et al. | 701/207 |
| 5,161,125 | 11/1992 | Maccabee | 367/99 |
| 5,327,149 | 7/1994 | Kuffer | 395/129 |
| 5,359,334 | * 10/1994 | Gutman | 342/158 |
| 5,367,615 | 11/1994 | Economy et al. | 395/129 |
| 5,517,419 | 5/1996 | Lanckton et al. | 364/449 |
| 5,557,397 | 9/1996 | Hyde et al. | 356/5.01 |
| 5,596,494 | * 1/1997 | Kuo | 701/207 |
| 5,646,907 | 7/1997 | Maccabee | 367/93 |

* cited by examiner

Primary Examiner—Gary Chin
(74) Attorney, Agent, or Firm—Perkins, Smith & Cohen, LLP; Jacob N. Erlich; Jerry Cohen (57) ABSTRACT

A dynamic optimal sensor employment system and method is used for searching an area. Each time the sensor in the search vehicle is activated, the dynamic optimal sensor employment system ("the system") determines which areas were searched at that moment. It does this by using a terrain database, information about the sensor state when it scanned (azimuth, elevation, mode, etc.), and a line-of-sight algorithm. The system determines this instantaneous coverage not only for the primary search vehicle, designated "ownership", but also for other teammates who report scan information to ownship via digital messages. The system maintains a dynamic history of all areas (e.g. 30 meter by 30 meter square "cells" of ground) that have been searched. Each cell has a counter that indicates how many time it has been scanned, and each time cells are scanned with ownship or team sensors the counter is incremented. Cells that are too steep or otherwise non-trafficable by a land vehicle, such as a lake or a river, are marked ahead of time to indicate there is no need to search them. The system then dynamically determines what sensor activations are required to search the areas that are known to be trafficable but have not yet been scanned by ownship or teammates. Specifically, it determines the time, location, direction, field-of-view, and altitude that best satisfy an optimization criteria, and then automatically activates the sensor to generate this coverage.

20 Claims, 5 Drawing Sheets

DYNAMIC OPTIMAL SENSOR EMPLOYMENT FOR SEARCHING AN AREA

STATEMENT OF GOVERNMENT INTEREST

This invention was made with Government support under contract DAAJ02-93-C-0008 awarded by the U.S. Army. The Government has certain rights in this invention.

FIELD OF THE INVENTION

This invention relates generally to object locating systems and more particularly to efficient use of a sensor in searching for objects from a moving platform, and to the complete coverage of an area to be searched.

BACKGROUND OF THE INVENTION

In searching an area to find an object of interest using a vehicle and a sensor, the search may be conducted from any type of human-operated or computer-operated vehicle: aircraft, land-based, sea-based, underwater, or spaced-based. The type of sensor includes radar, acoustic, visual, infrared, and any other type of sensor suitable to finding an object. An object of the search may be a vehicle, a person or any other type of object that one may find using a sensor. Possible obstructions to finding the object of the search include terrain, buildings, trees, and undersea topography. Given the above parameters, it is difficult to search an area completely and efficiently. The problems in searching efficiently and effectively given the above parameters are: 1. determining what areas the sensor "saw" during a particular "look"; 2. keeping track of areas that have already been searched; 3. determining how to optimally employ the sensor to continue the search to completion in a given search sector; i.e. when to use the sensor, what direction to point the sensor, what mode (e.g. field of view) of operation, and location and altitude of sensor activation.

An example of a search illustrating the problems detailed above involves using one or more aircraft and onboard radar to search for and locate vehicles on the ground. The aircraft fly at low altitudes and scan the ground using radar sensors. In order to search efficiently, it is best to search only those sectors of the search area traversable by the type of vehicle which is the search object. That is, those parts of the search area which are too steep or watery should not be included in an efficient search because it is already known that those areas could not hold a vehicle. Further, it is most efficient to keep track of those sectors of the search area that have already been searched. Due to terrain blockage, a given scan may miss areas on the ground that may hold a vehicle. It is therefore important to keep track of the details of how the sensor was used in each scan so that the area may be searched completely in subsequent scans.

It remains desirable to have an efficient and accurate search method and apparatus using a moving vehicle and a sensor.

It is an object of the present invention to provide a method and apparatus to efficiently search for an object from a moving platform using a sensor.

It is another object of the present invention to provide a method and apparatus to eliminate sections of a search scheme of an area due to unlikelihood of the search object's presence in that area.

It is another object of the present invention to provide a method and apparatus that keeps tracks of areas that have been already searched and eliminates them from the search scheme automatically.

SUMMARY OF THE INVENTION

The problems of accurately and efficiently searching an area from a moving vehicle using a sensor are solved by the present invention of a dynamic optimal sensor employment system for searching an area.

A sensor on some kind of a moving platform or search vehicle, e.g. a helicopter, either manned or unmanned, is used to search an area for some kind of object, e.g. a car. Each time the sensor in the search vehicle is activated, the dynamic optimal sensor employment system ("the system") determines which areas were searched at that moment. It does this by using a terrain database, information about the sensor state when it scanned (azimuth, elevation, mode, etc.) and a line-of-sight algorithm. The system determines this instantaneous coverage not only for the moving platform or search vehicle, such as the primary aircraft, designated "ownship", but also for other team members ("teammates") who report scan information to ownship via digital messages.

This system maintains a dynamic history of all areas that have been searched. This history is maintained in the form of an array where each cell in the array represents a section of the search area (e.g. 30 meter by 30 meter square "cells" of ground). Each cell in the array has a counter that indicates how many times the associated sector of the search area has been scanned, and each time the sectors are scanned with ownship or team sensors, the counter is incremented. Cells that are too steep or otherwise non-trafficable by a land vehicle, such as a lake or a river, are marked ahead of time to indicate there is no need to search them.

The system then dynamically determines what sensor activations are required to search the areas that are known to be trafficable but have not yet been scanned by ownship or teammates. Specifically, the system determines the time, location, direction, field-of-view, and altitude that best satisfy an optimization criteria, and then automatically activates the sensor to generate this coverage. In a military situation, it is preferable to perform the radar scans from a lower altitude to minimize exposure of the aircraft to threats. If the system determines that good coverage can only be obtained from a higher altitude, then it issues the appropriate commands to the autopilot and/or flight director to initiate a climb. The automatic scan activation is inhibited until the higher altitude is reached or a time-out occurs. At the higher altitude, the scan is reenabled. In this manner, the aircraft proceeds along a preplanned route, or anywhere else the pilot chooses, and the system automatically scans whenever and wherever appropriate.

The present invention does not deal with detection with the sensor. That functionality is available in current systems and is not covered in the description of the present invention. One key feature is that the system operates in an opportunistic fashion. That is, it does not rely on a preplanned route or preplanned sensor scans for its ownship or team members. Instead, it adapts to the current situation and employs the sensor only as needed. The system is also opportunistic in that it does not rely on selecting an observation point at some time in the future and then monitoring for an x,y,z capture criteria. Instead, the system is always watching for a good chance to activate the sensor, and does so immediately when it makes sense to do so.

The present invention together with the above and other advantages may best be understood from the following detailed description of the embodiments of the invention illustrated in the drawings, wherein:

DETAILED DESCRIPTION OF PREFERRED EMBODIMENT

The dynamic optimal sensor employment system ("the system") and method computes and maintains a coverage history array as a search of an area progresses, and determines where and how the sensor components of the system should scan in an effort to cover all trafficable portions of the area over the course of the search. The system activates its sensors in an optimal fashion by choosing time, position, altitude, direction and field-of-view.

Figure 1:
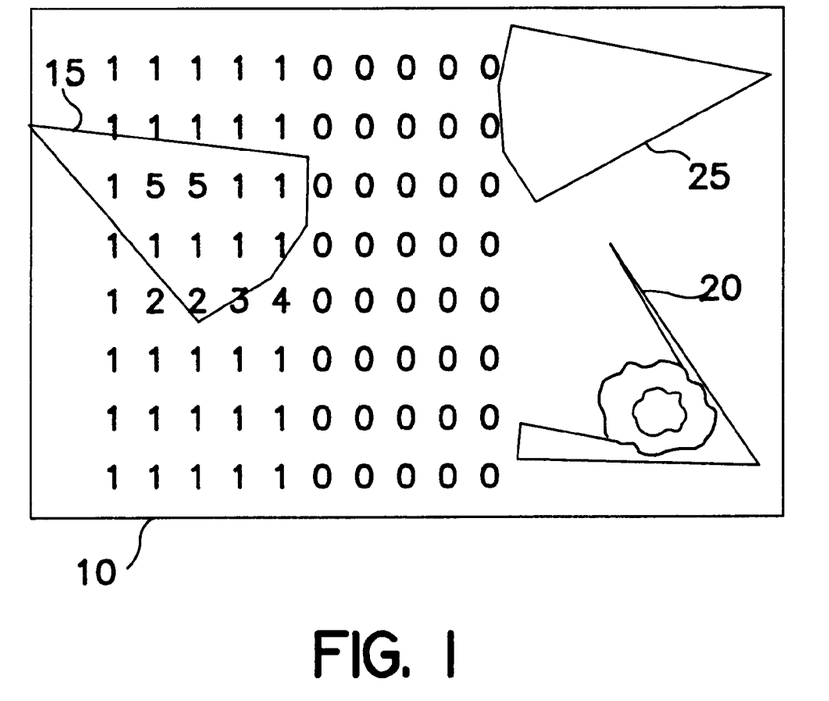
FIG. 1 is a diagram of coverage history array with representations of example sensor scans according to principles of the present invention.

FIG. 1 shows an example of a coverage history array 10 with representations of example sensor scans 15, 20, 25 according to principles of the present invention. The coverage history array 10 is an array of cells representing the area to be searched. In the coverage history array 10, each number represents one cell. In the present preferred embodiment, the cells are square areas of ground, which are for example 30 meters on a side. In alternative embodiments, the cells could be rectangular, hexagonal, or some other shape. Each cell has two main attributes that are computed before the search begins: (1) a "trafficability" value of true or false (e.g. a ground vehicle cannot travel through water or across terrain with a slope greater than 30–40 degrees); and (2) an elevation value relative to sea level (e.g. 138 meters). The trafficability values are stored in a database consulted during initialization. The elevation data is stored in a database consulted during the search process. Also, during the search process an additional attribute is computed and maintained: (3) a coverage history counter indicating the number of times a cell has been scanned by a search sensor. The values of the coverage history counter are added to those already in the coverage history array 10.

A goal of the system is to scan each cell exactly one time. If a cell is not scanned at all, then it was not searched, and the search object may be located in that cell. If a cell is scanned more than one time, the search is sub-optimal in that it takes longer, and in a military situation the search vehicle is exposed to more risk.

Figure 2:
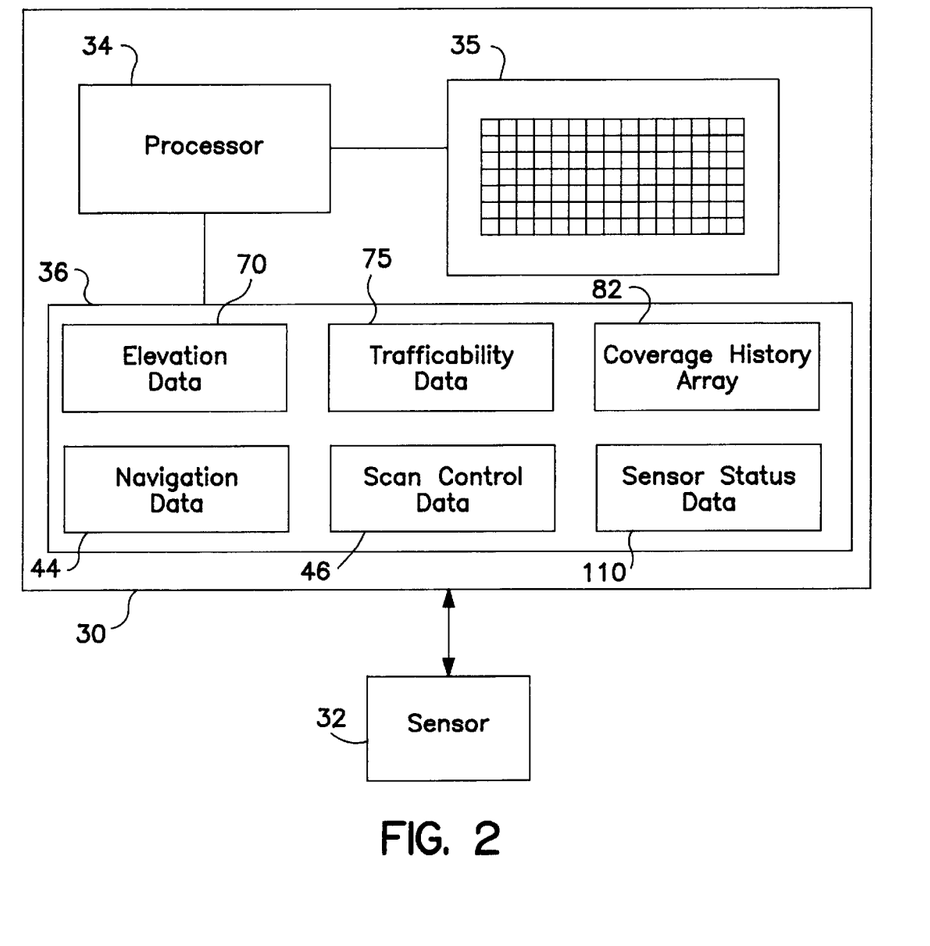
FIG. 2 is a block diagram of the dynamic optimal sensor employment system according to principles of the invention.

FIG. 2 is block diagram of a preferred embodiment of the dynamic optimal sensor employment system 30. The system 30 is connected to a sensor 32, such as a radar sensor. The system 30 has a processor 34 and a memory 35 and a database 36. The database 36 includes elevation data 70, trafficability data 75, a coverage history array 82, vehicle navigation data 44, scan control data 46 and sensor status data 110. The system 30 operates as described below with reference to FIG. 3. Typically, the system 30 with its associated components and the sensor 32 are contained in a search vehicle. Alternate embodiments, however, have only the sensor in the search vehicle, and the sensor communicates with the system 30 that is located somewhere off-vehicle. Further alternative embodiments of the invention have remote databases from which the elevation data, trafficability data, and so on is read.

Figure 3:
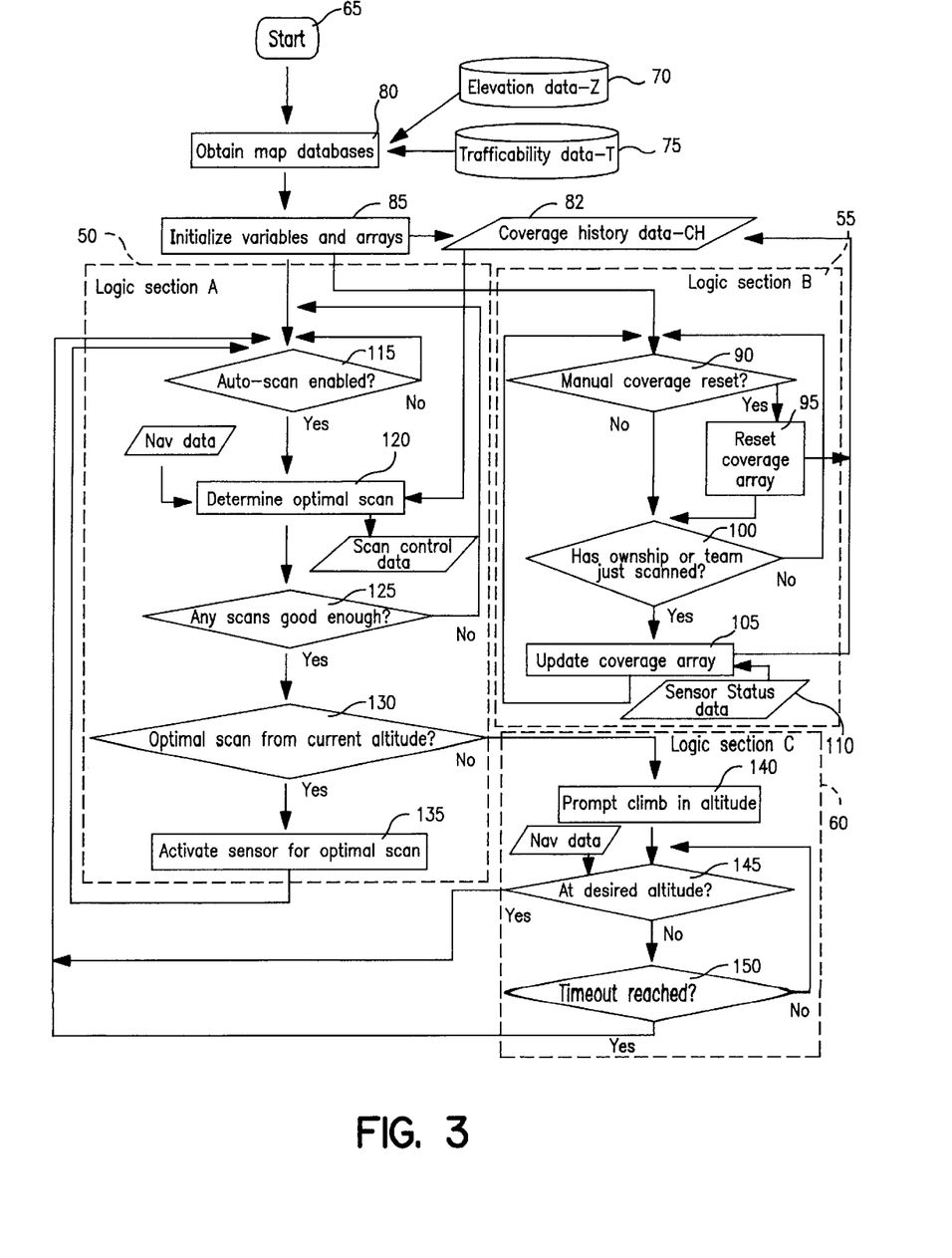
FIG. 3 is a flow chart of the method of the dynamic optimal sensor employment system according to principles of the invention.

FIG. 3 is a flow chart of the method of a preferred embodiment with diagrams of selected system elements according to principles of the invention. The method has three main sections, Section A 50 is the method for an automatic sensor scan; Section B 55 is a method to determine and record sensor coverage; and Section C 60 is the method for increasing altitude of the platform in response to scanning parameters.

The flow chart begins with system start-up, block 65. The system then reads from map databases, block 80. The map databases are stored in a manner accessible to the system in operation. The elevation data 70 (denoted by Z), which consists of a single elevation value for each map cell, is derived from a source such as the National Imagery and Mapping Agency's (NIMA) Digital Terrain Elevation Data (DTED). The elevation data 70 could also include buildings or other obstructions. Likewise, the trafficability data 75 (denoted by T) is topographical data that is derived from a combination of sources including DTED data and Digital Feature Analysis Data (DFAD). The DFAD data contains information about the type of features present on the ground: roads, bridges, towns, wooded areas, water, and so forth. The topographical data in the trafficability data 75 can also includes buildings. The trafficability data 75 is computed before the mission begins by the following steps:

1. Initialize all cells to true (meaning "trafficable").
2. Set the trafficability of all cells that contain water to false (which represents non-trafficable).
3. For each cell, calculate the slope to the four neighboring cells to the north, east, south and west, using the formula: slope=$(z.i-z.j)/d$, where $z.i$ is the elevation of the cell of interest, $z.j$ is the elevation of the neighboring cell, and d is the distance between the cells (e.g. 30 meters). If the absolute value of any of these four slopes is greater than the maximum slope permitted for the vehicle of interest, then set cell.i to false (not-trafficable).
4. Set all cells that contain a road feature to true. It is assumed that even if the slope is steep, but a road is present, the object vehicle may be located in that cell.

The trafficability data 75 is computed one time for the area of interest, and then read from storage for each mission.

After reading from the map database, the system initializes arrays and variables, block 85. The initialization includes allocating memory for the various data structures, setting control parameters such as mode of operation to their default values, and so forth. In this initialization step, the trafficability data T 75 is used to initialize the coverage history (CH) array 82. The CH is initialized by first setting all cells to 0, which means trafficable but not yet searched. Then for each cell whose trafficability is false, the CH value is set to 1, which means not trafficable, and therefore no search is required.

After initialization, the system continues along two separate and independent paths, an automatic scan method in Section A 50 and a scan coverage determination and recording method in Section B 55.

For clarity, the description of the system will continue with the scan coverage determination and recording method Section B 55 before describing the automatic scan of Section A 50.

For Section B 55, the system first determines whether the system operator has requested a reset/reinitialization of the coverage history array, decision block 90. If the operator has requested a reset/reinitialization, the system uses the trafficability data T 75 to reinitialize the coverage history array, block 95. If the operator has not requested a reset/reinitialization, the system determines whether the "ownship" (the prime aircraft conducting the search and implementing the invention) or a search team member has activated a new sensor scan, either manually or automatically, block 100. The information to make this determination is either received by the mission computer from the onboard sensor in the case of an ownship scan, or received via a digital message transmitted by any of the other team search vehicles. If a new sensor scan has not been activated, the coverage recording process returns to block 90. If a sensor scan has been activated, the system updates the coverage history array 82 for a single sensor scan, block 105.

The inputs to the process of updating the coverage history array are sensor status data 110 including: sensor location (s.x, s.y), sensor altitude (s.z), sensor pointing azimuth angle relative to true north (az), sensor field-of-view angle (fov) which specifies the width of the pie-shaped region the sensor scanned; and the elevation database Z 70. The maximum range (r.max) of the sensor is a constant value (e.g. 10,000 meters) in the present embodiment, but could be a variable value provided as an input to updating the coverage history array 82 in alternative embodiments of the invention. The processing performed in updating the CH array 82 consists of running a set of line-of-sight (LOS) calculations to determine which map cells meet the following two conditions: (1) are contained within the theoretical sensor "footprint" defined by s.x, s.y, az, fov, and r.max (FIG. 4); and (2) have an unobstructed LOS between the sensor and the cell (FIG. 5).

Figure 4:
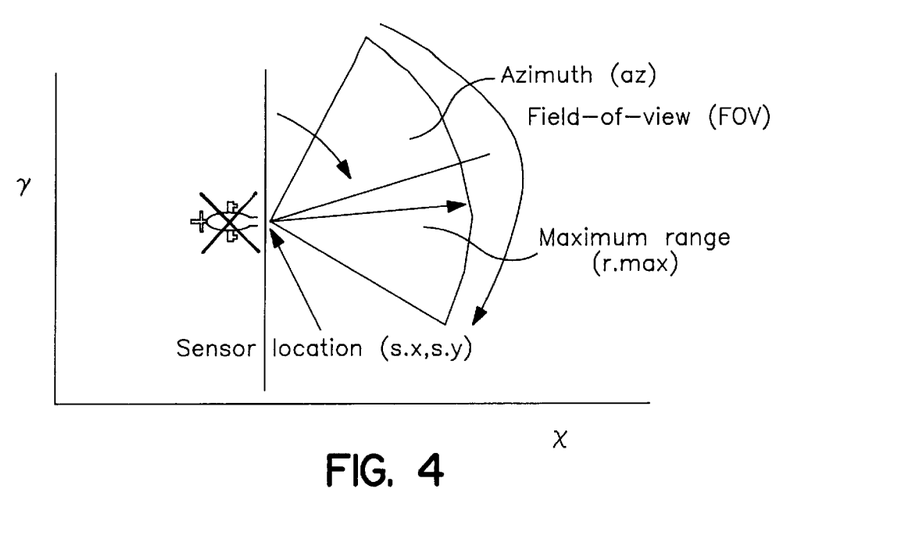
FIG. 4 is a diagram of a theoretical sensor footprint according to principles of the present invention.

FIG. 4 is a diagram of a theoretical sensor footprint defined by s.x, s.y, az, field of view (fov) and maximum sensor range (r.max). Each time the sensor is activated, it scans a particular area which includes one or more cells, and may include hundreds or thousands or cells. The theoretical sensor footprint represents the area scanned by the sensor during a particular scan having the characteristics described by location, angle and field of view. The system uses the theoretical sensor footprint of a scan to determine what cells the sensor potentially could have seen, without consideration of terrain blockage, during the scan.

Figure 5:
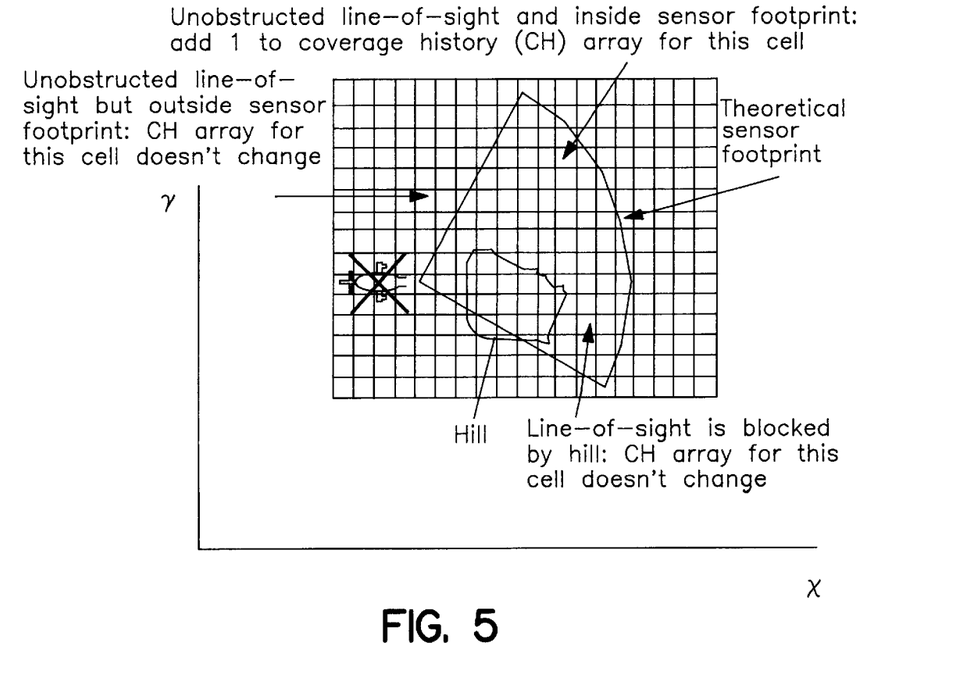
FIG. 5 is a top view of an area to be searched which illustrates obstructed line-of-sight and unobstructed line-of-sight; and, FIG. 6 is a diagram of a plurality of scan options for use in the method of FIG. 2 according to principles of the present invention.

FIG. 5 is a top view of a search area illustrating an obstructed line-of-sight and an unobstructed line-of-sight between a sensor and at least one cell from a moving platform, e.g. a helicopter. The line of sight is obstructed where a hill is located between the sensor and a cell. The elevation database Z 70 has the topography of the cell. In this example, the obstruction is a hill, but the obstruction could also be a building or underwater topography if the system is being used in a water environment.

There are various methods available in the literature for performing such LOS or intervisibility calculations. For example, several techniques are presented in a document prepared by the US Army TRADOC Analysis Center—White Sands Missile Range, *The Effects of Different Line of Sight Algorithms and Terrain Elevation Representations on Combat Simulations,* September 1995. Rather than processing a full 360 degree circle around the sensor location as is the case for an omnidirectional LOS calculation, the algorithm LOS rays are confined to the pie-shaped angular region of the sensor scan.

As shown in FIG. 5, cells that are within the theoretical footprint and that have unobstructed line-of-sight are identified as being searched by the current scan, and their value is incremented in the coverage history array. The coverage history array can be displayed to the operators as an image overlay on their tactical digital map display. In the present embodiment of the invention, cells that are not trafficable are color coded in, for example, one shade of blue, cells searched by ownship color coded in another shade of blue, and cells searched by a team member color coded in a third shade of blue. Other forms of coding may be used in the present invention. In this way, areas that still need to be searched remain free of any blue shading or indicative code.

Returning to FIG. 3, for the automatic scan, Section A 50, the system checks whether the operator has enabled the automatic sensor scan mode of the invention and whether the sensor is currently available for activation, block 115. This step is performed because the sensor may still be in the process of performing the previous auto-scan, or processing may be inhibited during a commanded climb to higher altitude. If the result is no because an automatic scan is not enabled to proceed, the system cycles and rechecks whether an automatic scan has been enabled.

If an automatic sensor scan has been enabled, the system then determines whether an automatic sensor scan should be initiated by ownship, which includes determining whether an optimal scan is available, block 120. This is a key step. The system determines the optimal sensor control parameters and timing, either immediately from the current location and altitude, or after a short delay from a higher vantage point. The optimal scan is determined by computing a figure-of-merit (FOM) for a number of possible scan options. The FOM is established such that it scores scan options higher if they have the following attributes: more coverage of previously unsearched trafficable cells, less coverage of cells already scanned, scan from lower altitude, coverage straight ahead of ownship, and narrower scans (because narrow scans can be executed faster and emit less energy). Returning to FIG. 1 which shows an example coverage history array with representations of example scans 15, 20, 25, it can be seen that two of these scans 15, 20 are less than optimal and one is optimal. The first scan 15, scanning from the left of the array and covering an area of the CH array having cells all valued at 1 or higher, is not optimal because it covers cells of the search area which are not navigable or which have been searched before. The second scan 20, scanning from the lower right of the array into an obstruction is also less than optimal because the scan cannot "see" any cells due to the obstruction. The third scan 25, scanning from the upper right of the array is an optimal scan because it sees only cells which are trafficable and which have not been searched before. In attempting to determine an optimal scan, the present embodiment of the system may analyze from forty-six to ninety-two scan options per second. In alternative embodiments of the invention, the scan options analyzed from be 100 to 1000 options.

Figure 6:
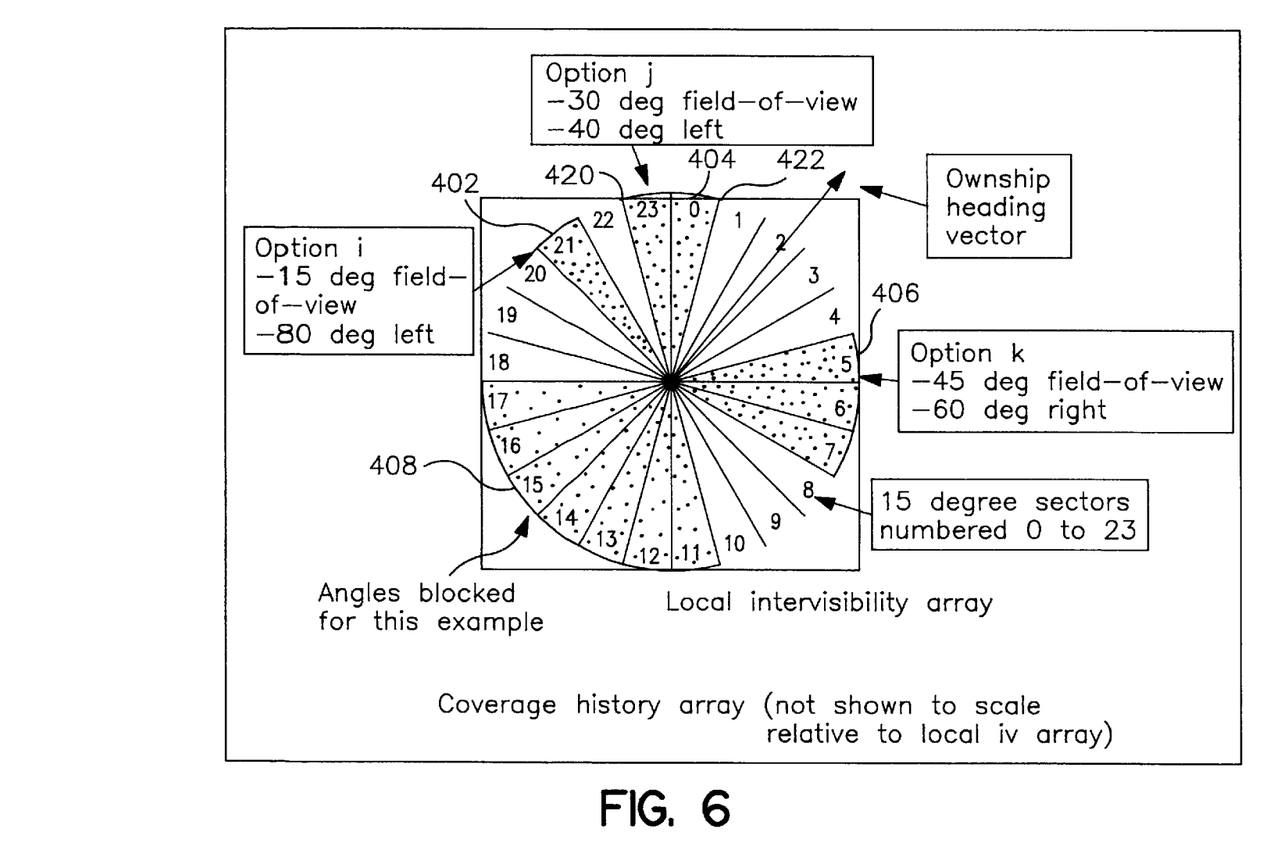

FIG. 6 is a diagram of scan options. FIG. 6 shows a coverage history array having a local intervisibility array which is an array localized at the sensor on the search vehicle. In other words, the local intervisibility array is an array of sensor views. The scan options are centered inside the local intervisibility array. The center of the local intervisibility array is also the location of the sensor. The ownship heading vector is shown pointing to the upper right of the coverage history array.

In the present embodiment of the invention, the options evaluated include but are not limited to forty-six from the "current" position and altitude. To be precise, the present embodiment uses the estimated position and altitude one second from the current time—the soonest time that an autoscan can be selected and activated. The forty-six options in the present embodiment of the invention are comprised of: a 15 degree FOV scan from any of eleven different directions, for example option i 402, a 30 degree FOV scan from any of twelve directions, for example option j 404, a 45 degree FOV scan from any of eleven directions, for example option k 406, and a 90 degree FOV scan from any of twelve directions (not shown). The system also addresses physical sensor constraints that may exist. In the present embodiment of the invention, the sensor can scan sideways but not backwards. The prohibited region is shown in FIG. 6 as element 408. In alternative embodiments, the sensor may scan backwards as well.

Under some conditions a second set of forty-six additional scan options are evaluated for a position 15 seconds along the ownship heading at a higher altitude of 300 feet AGL (Above Ground Level). The number 46 is merely exemplary and does not limit the present invention. These forty-six options are the same as those described above, i.e. four fields of view (FOV's) in each of eleven or twelve different directions. This second set of forty-six high altitude options are not considered under either of the following two conditions: 1. the mode of operation enables only scans from current altitude, or 2. a "climbing state" global variable contains the value "reached" which indicates the ownship has already climbed up to a higher altitude in response to a prompt by the invention.

The scan options are evaluated using a two stage figure-of-merit scoring function. The first stage score is based on a formula including "new" cells seen, "duplicate" cells seen by a particular scan, and weighted values. The second stage score is based on a formula including the first stage score, direction of the sensor, altitude and weighted values. The stages will be described more fully below. The two stage scoring permits less important factors to improve the solution without dominating more important factors. A fuzzy logic or other type of scoring function could be used in alternative embodiments of the invention. For a given sensor position and altitude, a 360 degree intervisibility line-of-sight calculation determines which cells can be seen from that position, i.e. are not obstructed by terrain. As discussed above, there are various array-updating algorithms available. Using the intervisibility results along with the CH array that is maintained by the system, a count is then performed for each 15 degree sector of how many new (previously unsearched and trafficable) cells can be seen and how many duplicate cells can be seen. The duplicate count is a running tally of the number of times a cell has been searched since the last reset. These counts for each 15 degree sector are then used to determine counts for each scan option. In FIG. 6 for example, the new and duplicate counts for scan option 404 are simply the sums of the counts for 15 degree sectors 420 and 422. A wider scan in the same direction would include the counts from 420 and 422 as well as appropriate neighboring 15 degree sectors.

Each scan option is tested to see if it picks up a minimum number of new cells. The minimum number of new cells in the current implementation is FOV-dependent and set to 100, 200, 300, or 600 for FOV's of 15, 30, 45, and 90 degrees respectively. The number is also related to the maximum sensor range and size of the cells which are both constant in the current implementation. The threshold is a function of the scan FOV so that more previously unsearched cells must be scanned by a wider FOV scan than by a narrower scan. This avoids having a wide FOV scan activated too early and often. All scan options exceeding the threshold are then scored.

The first stage score is computed using:

$s1 = w1*\text{new} - w2*\text{duplicates}$, where s1 is the first stage score, "new" and "duplicates" are the counts just described, w2 is a constant weight set to 0.1, for example, and w1 is a FOV-dependent weight of, for example, 1.08, 1.04, 1.02, 1.01 for FOV's of 15, 30, 45, and 90 degrees respectively. w2 favors narrow scans if they can pick up nearly as many new cells as wider scans.

The best N options are selected to receive second stage scoring. Currently the best seven scan options from each set of forty-six are selected for second stage scoring. There is a total of N=14 options in those cases where all ninety-two scan options are selected. The second stage score is computing using:

$s2 = s1 + w3*\text{direction} + w4*\text{altitude}$, where s2 is the final score, w3 is a constant weight of 10, direction is a term of either 8, 4, 2, or 1 depending on the FOV and how close the sensor is pointed to straight ahead, w4 is a constant weight of 10, and altitude is a term that ranges from, for example, 8 to 1 where 8 corresponds to an ownship altitude of, for example, 0 to 30 feet AGL, 7 for 31 to 60 ft, 6 for 61 to 90 ft, and so on, and 1 if $\geq 240$ ft. This value system favors lower altitude scans. Other value systems may be devised within the scope of the invention.

Returning to FIG. 3, the system identifies the optimal scan by selecting the option with the highest s2 value, block 120. The relative weights or the list of factors evaluated in the scoring process can be modified depending on the application. The scoring system is merely exemplary and other systems could also be used within the scope of the present invention.

The system checks whether any scans exceeded a minimum threshold to be activated, block 125. Since scan options that did not meet a minimum threshold were eliminated prior to stage 1 scoring in block 120, the system needs to check only if any options were scored. If no scans exceed their thresholds, the result is no and the system cycles back to the beginning of the autoscan section, Section A 50.

If one or more scans do exceed the threshold, the system checks whether the optimal scan that has been selected should be performed immediately from the current location and altitude, block 130. If the result is no, the system sets the "climbing state" global variable to the value "climbing" and the flow branches into Logic section C 60 to increase ownship altitude before scanning. If the result is yes, the scan is automatically activated, block 135. Before ending the process, the system checks the "altitude reached" timer. If the timer has expired, meaning ownship has been at high altitude for long enough to trigger the scan but the scan has not occurred, then the system resets the "climbing state" global variable to the value "none".

The system issues the appropriate control signals to the sensor subsystem, block 135. The system first checks the status of the sensor, and if the sensor is busy because the operator is using it in a manual mode, then nothing happens in this cycle. Otherwise the control signals corresponding to the optimal scan are sent to the sensor. These are commands to point to the desired direction, set the field-of-view, and activate an auto-scan. It also issues an advisory massage to an operator display to keep him aware that the system is operating autonomously and has just performed a scan. If the "climbing state" global variable contains the value "reached", the system sets it to the value "none", block 135. After initiating the optimal scan, the logic flow loops back up for another cycle.

The process of increasing altitude in using the sensor is now described, section C 60. The system prompts an increase in altitude, block 140 when the aircraft is at too low an altitude to perform an optimal scan. The system prompts an increase in one of two ways: (1) If the operator has selected the fully automatic mode, the system issues the appropriate control signals to the auto-pilot subsystem to cause the aircraft to climb to a higher altitude (e.g. 100 meters above ground level (AGL)). (2) If the operator has selected semi-automatic mode, the system instead issues a "Climb for scan" advisory message to a pilot display. In this case, the pilot will normally choose to follow the recommendation and increase altitude. The system, however, must also operate properly if the pilot ignores the message (e.g. the pilot may be busy dealing with a higher priority task), which is handled with a timeout as described below. Before exiting, the system starts a "climbing" timer to be used as described below.

The system then checks whether ownship has reached the desired high level scan altitude, block 145. If the result is yes, it sets the "climbing state" global variable to the value "reached", starts an "altitude reached" timer, and the system returns to Section A 50, and determines whether the autoscan has been enabled, block 115.

If the result is no, the system checks whether the time elapsed since the climb was commanded has exceeded a predetermined waiting period (e.g. 15 seconds), block 150. If the result is no, the flow loops back to block 145 to continue waiting for the higher altitude. If the result is yes, the system sets the "climbing state" global variable to the value "none", and the logic flow returns to the top of Logic section A 50.

The searching continues searching by repeating the steps set forth above with respect to Sections A 50, B 55, and C 60, ideally until all navigable cells have been searched at least once.

It is to be understood that the above-described embodiments are simply illustrative of the principles of the invention. Various and other modifications and changes may be made by those skilled in the art which will embody the principles of the invention and fall within the spirit and scope thereof.

What is claimed is:

1. A method for searching from a moving platform, for an object in a search area, comprising the steps of:
   providing a first sensor located on the moving platform;
   providing a coverage history array where each cell in said array represents a section of the search area;
   providing trafficability data for the search area;
   initializing said coverage history array with said trafficability data;
   providing elevation data for the search area;
   optimizing a scan of the search area in response to sensor location in the search area, said coverage history array, and said elevation data;
   performing a scan using said first sensor; and
   updating said coverage history array with data from those cells searched in response to said scan.

2. The method of claim 1 wherein said updating step further comprises:
   determining the searched cells using sensor location and angle in conjunction with said elevation data in a field of view of said first sensor.

3. The method of claim 1 further comprising:
   determining a theoretical sensor footprint to define a scanned area; and
   updating said coverage history array with said theoretical sensor footprint.

4. The method of claim 1 wherein said updating step further includes providing a designation in each cell.

5. The method of claim 1 wherein said first sensor is a radar sensor.

6. The method of claim 1 wherein the trafficability data includes topographical data.

7. The method of claim 6 wherein the topographical data is topography of land.

8. The method of claim 6 wherein the topographical data is underwater topography.

9. The method of claim 1 wherein said optimizing step further comprises line-of-sight determinations.

10. The method of claim 1 wherein said optimizing step further comprises determining time, position, altitude, direction and field of view for a next scan by said first sensor.

11. The method of claim 1 wherein said initializing step comprises setting each cell in said coverage history array corresponding to a trafficable sector by a first designation to true and setting each cell in said coverage history array corresponding to a nontrafficable sector by a second designation to false.

12. The method of claim 1, further comprising the steps of:
    providing a second sensor located on a second moving platform;
    optimizing a scan of the search area by said second sensor in coordination with said first sensor in response to second sensor location in the search area, said coverage history array, and said elevation data;
    performing a second scan using said second sensor; and
    updating said coverage history array with data from those cells searched in response to said second scan.

13. A system for searching from a moving platform for an object in a search area, comprising:
    a first sensor located on the moving platform;
    a coverage history array where each cell in said array represents a section of the search area;
    a trafficability database having data to be used in initializing said coverage history array;
    an elevation database having elevation data for the search area;
    means for optimizing a scan by said first sensor in response to sensor location in the search area, said coverage history array, and said elevation data; and
    means for updating said coverage history array with information from those cells searched in response to said scan by said first sensor.

14. The system of claim 13 wherein said means for updating said coverage history array further comprises means for determining searched cells from sensor location and angle in conjunction with said elevation data in a field of view of the first sensor.

15. The system of claim 13 wherein said means for updating said coverage history array further comprises:
    means for determining a theoretical sensor footprint defining a scanned area; and
    means for updating said coverage history array using said theoretical sensor footprint.

16. The system of claim 13 wherein said first sensor is a radar sensor.

17. The system of claim 13 wherein said means for optimizing further comprises means for determining a line-of-sight between said first sensor and the search area.

18. The system of claim 13 wherein said optimizing step further includes means for determining time, position, altitude, direction and field of view for a next scan by said first sensor.

19. The system of claim 13 further comprising:

a second sensor on a second moving platform;

means for optimizing a second scan by said second sensor in coordination with said first sensor in response to second sensor location in the search area, said coverage history array, and said elevation data;

means for updating said coverage history array with information from those cells searched in response to said second scan.

20. A system for searching for an object in a search area, comprising:

a search vehicle having a sensor;

a computer processor associated with said search vehicle and receiving and sending signals to said sensor;

an elevation database connected to said computer processor, said elevation database storing elevation data of the search area;

a trafficability database connected to said computer processor, said trafficability database storing trafficability data of the search area;

a coverage history array having a plurality of cells, each said cell representing a section of the search area, said coverage history array to be initiated with data from said trafficability database;

whereby said search vehicle navigates the search area, said computer processor to signal said sensor when a scan is appropriate based on said coverage history array and data from said elevation database, and said coverage history array is updated in response to those cells determined to have been searched in each scan.

* * * * *

UNITED STATES PATENT AND TRADEMARK OFFICE
CERTIFICATE OF CORRECTION

PATENT NO. : 6,212,471 B1
DATED : April 3, 2001
INVENTOR(S) : Peter N. Stiles et al.

It is certified that error appears in the above-identified patent and that said Letters Patent is hereby corrected as shown below:

ABSTRACT,
Line 10, "designated ownership" should read "designated ownship"; and
Line 14, "Each cell has a counter that indicates how many time" should read "Each cell has a counter that indicates how many times".

Column 4,
Line 26, "includes" should read "include".

Signed and Sealed this

Fifteenth Day of January, 2002

Attest:

Attesting Officer

JAMES E. ROGAN
Director of the United States Patent and Trademark Office